United States Patent [19]

Veazey

[11] Patent Number: 5,176,394
[45] Date of Patent: Jan. 5, 1993

[54] TOWING RIG FOR FLOATING OBJECTS

[76] Inventor: Sidney E. Veazey, Rte. 2, Box 497, Fredericksburg, Va. 22405

[21] Appl. No.: 357,724

[22] Filed: May 26, 1989

[51] Int. Cl.⁵ .............................................. B60P 3/10
[52] U.S. Cl. ............................ 280/414.2; 280/414.1; 280/414.3; 114/344; 414/483
[58] Field of Search ............... 280/292, 414.1, 47.331, 280/789, 656, 149.2, 414.2, 414.3, 717; 414/483; 114/344; 305/15, 60

[56] References Cited

U.S. PATENT DOCUMENTS

| | | | |
|---|---|---|---|
| 1,376,496 | 5/1921 | Woodruff | 114/344 |
| 1,691,633 | 10/1926 | Bertram | 114/344 |
| 2,415,771 | 11/1945 | Agtmael | 114/344 |
| 2,457,397 | 12/1948 | Richards | 280/716 |
| 2,458,209 | 1/1949 | Sawatzki | 280/414.3 |
| 2,501,750 | 3/1950 | Warner | 280/47.331 |
| 2,594,540 | 4/1952 | Cole et al. | 280/414.3 |
| 2,660,443 | 3/1951 | Miller | 280/65 |
| 2,895,705 | 7/1959 | Maham | 280/414.1 |
| 2,967,719 | 1/1961 | Williams | 114/344 |
| 3,004,771 | 5/1961 | Moore, Jr. | 114/344 |
| 3,284,821 | 11/1966 | Zoretic | 114/344 |
| 3,889,973 | 6/1975 | Fehseke | 280/414.1 |
| 4,023,222 | 5/1977 | Selby | 114/344 |
| 4,077,553 | 3/1978 | Miller | 224/42.1 |
| 4,092,755 | 6/1978 | Hughes | 280/149.2 |
| 4,114,772 | 9/1978 | Beelow | 114/344 |
| 4,480,578 | 11/1984 | Fisher | 114/344 |
| 4,515,102 | 5/1985 | Kury | 114/344 |
| 4,611,820 | 9/1986 | Massey et al. | 280/414.2 |
| 4,801,153 | 1/1989 | Wilson | 280/414.1 |

FOREIGN PATENT DOCUMENTS 0972393  8/1975  Canada ............................ 280/414.2

Primary Examiner—Charles A. Marmor
Assistant Examiner—Anne Marie Boehler
Attorney, Agent, or Firm—James K. Poole

[57] ABSTRACT

An improved towing rig for objects such as mobile floating dock sections for small craft moorings includes a towing fixture with a connection for a tow tractor, at least one connector adapted for swivelable connection to a forward or side vertical surface of the object to be towed and a load-distributing assembly adapted to bear upon at least the upper surface of the towed object when a pull is exerted upon the tow bar assembly of the towing fixture. The towing rig can further include at least one wheel-axle assembly adapted for temporary attachment to the object to be towed. The wheel-axle assembly is preferably buoyant in water to permit easy mounting and recovery with a towed floating object in the water.

19 Claims, 2 Drawing Sheets

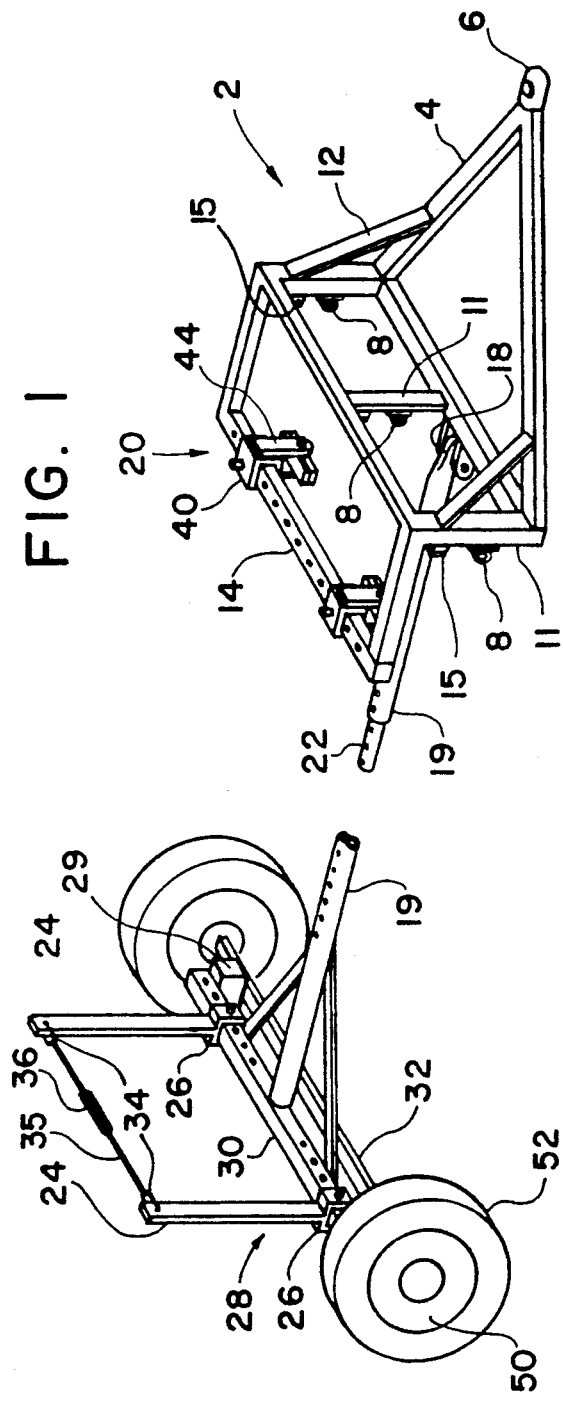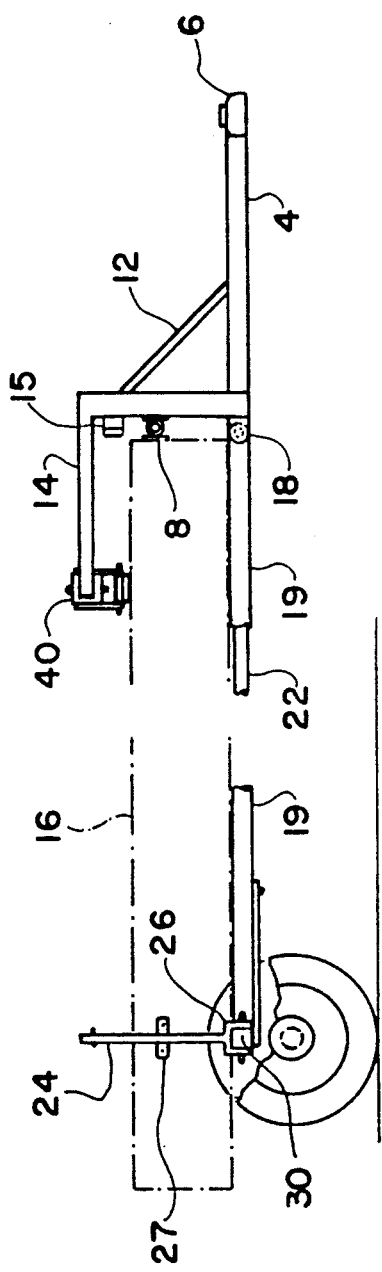

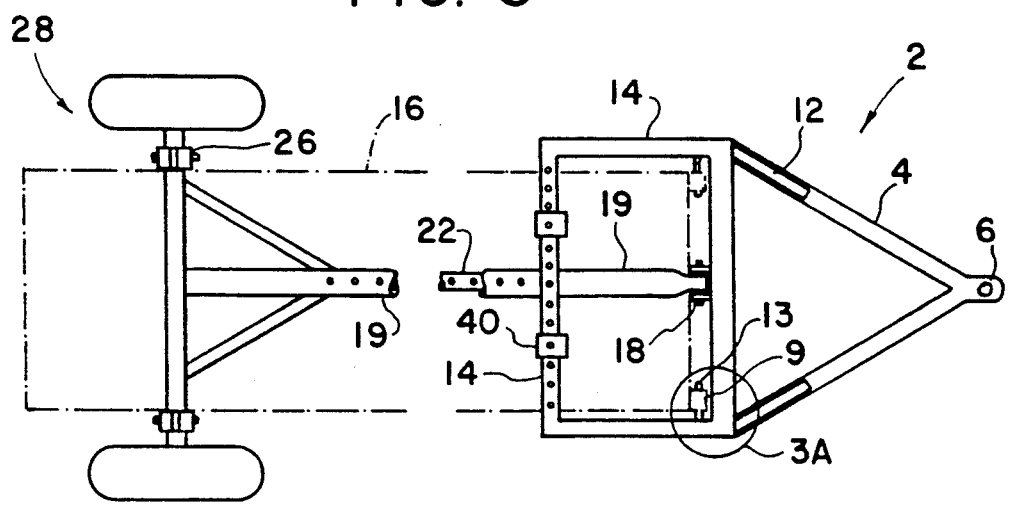
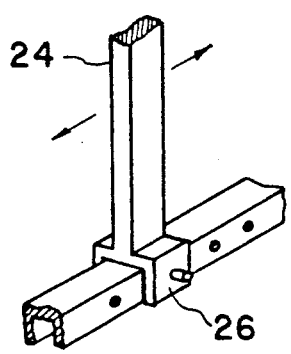
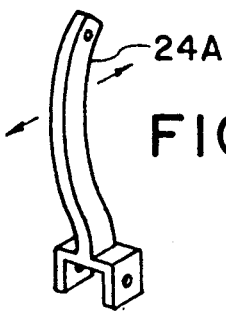
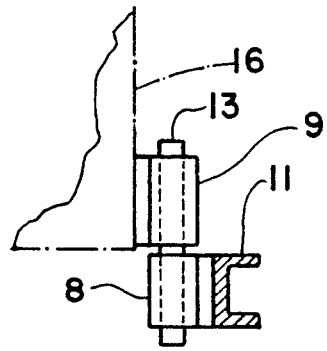
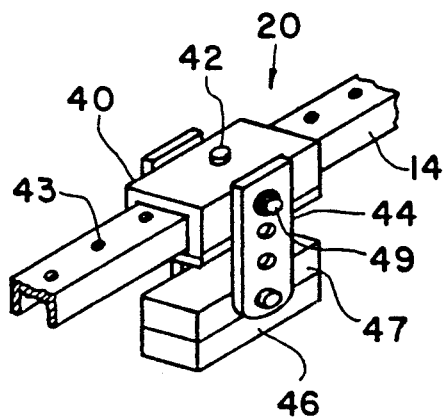
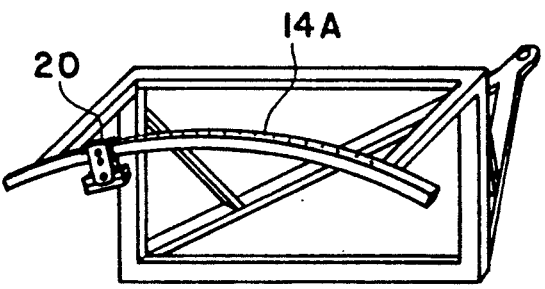

TOWING RIG FOR FLOATING OBJECTS

BACKGROUND OF THE INVENTION

1. Field of the Invention

This application pertains to systems for transporting, launching and recovering floating objects such as boats, and particularly for such operations with floating dock sections intended for use with small boats.

2. Prior Art

Ever-increasing numbers of water-borne platform, boats and other small water craft are being used in the United States and other countries, not only for recreation but in support of various industries such as the lumber industry, offshore oil industry, the fishing industry and in tourism. In many cases, it is desired to transport such water craft overland to the point of use, or to transport overland containers across water to be loaded upon ships, where permanent docking facilities may or may not be available. A wide variety of boat trailers and other transport means have been developed for transporting, launching and recovering small boats, as will be described below. Among the more difficult water craft to transport are large, bulky, floating units such as swimming floats, floating pier sections, rafts, pontoon boats and the like. Many such units are difficult to transport because their underbodies include exposed portions of soft flotation material. In many areas it is impractical to construct permanent docking facilities for small craft at the point of use due to the cost of permanent construction, seasonal weather conditions and governmental regulations which restrict shoreline construction. Therefore, temporary docking facilities made up of floating sections have become popular. However, due to their bulky size and configuration (typically, for recreational use, from six to twenty feet long, three feet to eight feet wide, and at least two feet in depth), the launching, recovery and transport of such units can be difficult. Therefore, in addition to the production of improved trailers and other transport means for the launching, recovery and transport of conventional self-propelled boats, there is a need apparent for improved transport means for bulky floating objects such as floating small craft dock sections.

The patents described below disclose various means for transporting small craft such as boats, but there is apparently no efficient means available for transporting bulky objects such as floating dock sections overland to a site for use where they can be launched and later recovered for further transport. In the absence of specific trailer assemblies designed for such units, it would be necessary to employ at least a large truck to transport such units, drawing upon man-handling or cranes to remove the units from the transport and launch or recover the units from the water.

U.S. Pat. No. 4,077,553 illustrates and describes various adjustable anchoring devices for retaining boats on trailers or on top of automobiles, such that a boat can be transported in either an upright or inverted position. FIGS. 8, 9 and 11 show swivel-mounted, turnbuckle-adjustable anchoring devices for securing a boat to the frame or axle of a trailer. There appears to be no suggestion of rigid anchoring devices which are hinged to a trailer axle and can be secured across the top of a large floating object to fasten the trailer wheels to the bottom and thus transform the floating object (such as a dock) into a self-trailerable assembly.

U.S. Pat. No. 3,004,771 discloses buoyant trailer assemblies which can be positioned under a floating boat for removing it from the water as described at the bottom of column 2 and the top of column 3 of the patent.

U.S. Pat. No. 2,660,443 describes a boat trailer in which a hold-down batten number 47 can be placed athwartships and secured vertically to threaded rods number 48 with wing nuts 49. This merely provides vertical pressure to secure the boat to the bed of the trailer, and does not suggest placing lateral pressure on an object such as a floating dock to secure an axle and wheels thereto.

U.S. Pat. No. 2,415,771 discloses several versions of boat trailers including framework structures which suspend a boat from above rather than supporting it from below, with subframes which are pivotably mounted to facilitate dropping a boat into the water and returning the trailer to dry land. A simpler version without the provided subframe is shown in FIG. 4, but even this version does not appear to suggest a tow frame which places pressure on the top of an object such as a floating dock when a typical towing force is applied to the assembly.

Bertram's U.S Pat. No. 1,691,633 discloses trailers designed to carry folding boats, including general hold-down assemblies in the tongue area and hold-down straps 28 which can extend across the top of the folding boat and secure it to the trailer frame.

As stated above, applicant is unaware of any system specifically designed to provide for the efficient overland transport, launching and recovery of floating objects, such as floating dock units, in the prior art. Accordingly, it is an object of the present invention to provide improved systems adapted for the transport, launching and recovery of floating objects including, but not limited to, floating dock sections for small craft, and particularly for systems which can be handled by the homeowner or small business owner to launch and recover seasonal docking facilities for small craft.

BRIEF DESCRIPTION OF THE FIGURES

These and further objects of the present invention will be readily apparent from the following description together with the accompanying drawings, in which FIG. 1 is a perspective view of a complete assembly for towing a floating dock;

FIG. 2 is a side elevational view of the assembly of FIG. 1;

FIG. 3 is a plan view of the above towing assembly;

FIG. 3A is a detail perspective view of the hinged connection between the towing fixture and dock section;

FIG. 4 is a detail view of the hinged securing bars of FIG. 1;

FIG. 4A is a detail view of a curved securing bar which can be used to secure cylindrical objects;

FIG. 5 is an end view of a towing fixture adapted for towing objects with a rounded top surface; and FIG. 6 is a perspective view showing details of the towing fixture.

SUMMARY OF THE INVENTION

In accordance with the present invention there is provided an improved towing rig comprising a towing fixture with a connection for a tow tractor, swivelable connecting means adapted for connection to a forward surface of an object to be towed and a load-distributing bar assembly which bears upon at least one forward surface of the object to be towed when a drawbar pull is exerted upon the tow bar assembly of the towing fixture, thereby forming a stable unit for towing. The load-distributing bar assembly includes a vertical member having vertically swivelable connecting means and a substantially horizontal member, as illustrated in FIG. 1. The improved towing rig can further include at least one wheel-axle assembly adapted for temporary attachment to the object to be towed and which is preferably slightly buoyant to facilitate its placement under a floating object for recovery thereof or removal and recovery once such a floating object is launched. The wheel-axle assembly includes attachment means, which in the embodiments shown include at least two securing bars hingeably attached to the assembly and tensioning means to exert pressure on the object to be towed and fix the assembly firmly in position. Optionally, the wheel-axle assembly can be connected to the towing fixture with a rigid connector, preferably by a swivel or universal joint connection. Although the towing fixtures employed in the towing rig of the present invention are illustrated primarily in configurations which are adapted to the towing of large, boxy units such as floating dock sections, the towing fixture can also be configured for the efficient towing of objects with rounded configurations such as logs, as indicated in FIG. 5.

DETAILED DESCRIPTION OF THE INVENTION

Although the present invention will be discussed in detail with reference to the transport, launching and recovery of floating objects such as floating dock sections for small craft, the towing rig disclosed and claimed can be scaled up and/or adapted for use with larger units, or units of varied shapes and sizes as well. While the towing rigs disclosed herein offer particular advantages for the transport of floating objects, they can also be used for transporting bulky objects which are non-buoyant or non-watertight, such as cargo containers and the like. The towing rig includes at a minimum the towing fixture described below with reference to the figures, which can be attached to the leading surface of an object to be towed and can be employed even without a wheel-axle assembly to tow objects over sand, mud, snow or other low friction surfaces. Normally, an axle-wheel assembly is employed which can be temporarily affixed to the object to be towed, as illustrated in the figures and discussed below. Thus, a simple, efficient and economical system is available for transporting such objects between storage and waterfront sites, as well as for launching and recovery of the units.

Referring now to FIGS. 1, 2 and 3, the towing fixture 2 of the present invention includes a tow bar assembly 4 with suitable connection means 6 for connection to a tow tractor, with at least one swivelable connector 8 on a vertical member 11 at the other end for connection to at least one fixture at the leading edge or surface of the object to be towed. By the "leading" edge or surface is meant the point or vertical surface nearest the point where the towing fixture is to be attached, with the opposite surface being termed the "after" surface and the remaining surfaces of a rectangular object being the sides. Various commercially available systems such as trailer hitches and ring and pin assemblies can be used. Preferably, a hinge post or swivel connector is used which can be easily connected to fixtures which are easily installed on the objects to be towed, such as the horizontal hinges used on commercial floating dock sections to interconnect the sections. Such connections can be seen most clearly in FIG. 3A, in which the hinge post(s) 8 on the towing fixture aligns with a similar hinge post 9 on the towed object so that they can be joined with a pin 13. As shown in FIG. 1, one or more swivelable connections can be provided between the towing fixture and the towed object, generally being mounted centrally or in pairs. Alternatively, horizontal members can be extended from the outer surfaces of the vertical members 11 of the fixture to connect pivotably with rods extending from both sides of the towed object, thus achieving a pivotable or swivelable connection between fixture and towed object.

The towing fixture includes a vertical bar structure 11 which corresponds generally to the contours of the leading edge of the object to be towed and positions connecting means. Braces 12 can be provided between the tow bar assembly and the vertical bar assembly. An upper bar assembly 14 is provided which is spaced a distance above the swivel connection to the object to be towed so that it will bear upon at least the forward top surface 16 of the object being towed to distribute the load and provide a stable towing connection when a lifting and towing force is provided at the tow bar. The bar assembly acts as a load-distributing means to restrain the towing fixture from rotating excessively and avoid placement of significant loading upon the weaker portions of the towed object, such as the soft flotation materials normally exposed on the undersides of floating dock sections. While the present embodiments have emphasized fixtures and connectors which distribute the load to the upper surface of towed objects such as floating docks, fixtures can be designed to distribute the load over the optimum portions of a particular object to be towed. Thus, at least part of the load can bear upon the bottom of the object, or particularly upon the leading surface of the object, as shown by pad 15 in FIG. 2. In addition to distributing the load to the strongest portions of the towed object, the fixture can be designed to distribute the load so that either positive, negative or essentially neutral tongue weight is obtained (at connector 6) when towing the unit. Swivel 18 at the bottom of the vertical bar assembly can be used to attach a rigid connector bar 19, if desired, when the wheel-axle assembly is included. The connector bar can be adjustable in length, as shown at 22 in FIG. 1. Any suitable means of extending the length of the connector bar can be used. For example, as shown in FIG. 1, a central tube 22 can be placed telescopically within the forward and rear sections of the connector tube 19 and positioned appropriately by placing pins, bolts or the like in holes 21 in the connector tubes and corresponding holes in the tube 22.

The wheel-axle assembly 28 is configured for temporary but stable installation directly to the object being towed. Depending upon the load to be carried and the terrain to be negotiated, this assembly can be as simple as that for a coaster wagon, but preferably includes a frame 30 and suspension system 29 as illustrated in the figure. Securing means for firmly securing the wheel-axle assembly to the towed object are included, which can take the form of the at least two securing bars 24 connected by hinge means 26 to the frame 30 or axle 32 and including tensioning means 34 at the top ends such as chain or cable 35 and turnbuckles 36. To install the wheel-axle assembly, the towed object is rested upon the axle or frame, the securing bars are held in place along the sides of the towed object and tension is applied to provide sufficient pressure on the towed object to hold the wheel-axle assembly firmly in place. As shown in FIGS. 4 and 4A, the securing bars 24A can be curved to fit the contours of various objects to be towed; securing bars which are flexible and springy or deformable can also be employed for similar purposes to securely attach the wheel-axle assembly to towed objects which are cylindrical or irregular in shape. The curved bar 24A in FIG. 4A thus illustrates the bar of FIG. 4 which is permanently bent, flexible or deformable to suit the contours of towed objects. As shown in FIG. 2, when long distance towing or rough terrain are involved, the securing bars 24 can be fastened to the towed object by brackets 27 or other suitable means to prevent longitudinal displacement during towing operations. While conventional automotive wheels 50 and tires 52 are shown for these embodiments, any suitable wheels can be used, including solid wheels, cycle wheels, rollers, pneumatic rollers or other devices suitable to the loads and surfaces involved. Optionally, as shown in FIGS. 1, 2 and 6, load-bearing fixtures or pads can be installed on the upper bar assembly 14 and/or vertical or lower bars to provide non-skid, non-marring pressure on the towed object.

In FIG. 6, the fixture 20 includes sliding bracket 40 which can be secured by pins or bolts through hole 42 in the bracket and holes 43 in bar 14, an extension bar 44 (which can be adjustable by placement on studs 49, as shown in FIG. 6), and non-skid pad 46, firmly attached to pressure plate 47. Pad 46 can be made of any suitable rubber or polymeric material.

Although the invention is illustrated in simple embodiments so as to present the key elements, enhanced versions can of course be employed within the scope of the present invention. For example, if highway transportation of the units is to be undertaken, the wheel-axle assembly can include conventional braking and lighting units such as commercially used on boat trailers. These units are well known and commercially available and are therefore not illustrated in the present figures. When a suspension system is appropriate, any suitable suspension means can be used which will transport the towed unit with the desired degree of smoothness over the terrain to be negotiated. Various spring means such as coil or leaf springs can be used, including pneumatic aids and air suspension means, which provide a smoother ride and increase the buoyancy of the wheel-axle assembly. Shock absorbers can be employed where appropriate. Such suspension system components are widely commercially available.

In many cases the wheel-axle assembly can be handled more easily during launch and recovery operations if it is of variable buoyancy. This can be accomplished by any suitable means, including the introduction of water into the tires, variable inflation of air suspension means, buoyancy bladders or the like, or the use of external flotation equipment or weights when greater or less buoyancy is desired.

By using towing fixtures with appropriate configurations, objects having a wide variety of shapes can be towed, with the resultant load being distributed to locations where such pressure can best be withstood, including the forward vertical surfaces as well as the top surface, or even the lower surface, as when a negative tongue weight is expected while towing. By using multiple adjustable load-bearing fixtures 20, a variety of irregular shapes and surfaces can be accommodated.

As shown in FIG. 5, the towing fixture can be configured with a curved top bar 14A to provide the requisite downward pressure across the top surface of an object with a convex surface such as a log, tank, pipe or inflatable marine fender, using adjustable load-bearing fixtures 20 to provide a more exact fit. This permits easy towing of such objects while in the water or even in dragging and skidding across ground surfaces which are reasonably low in coefficient of friction such as sand, mud, snow and the like. If such objects are to be towed using the complete towing rig including the wheel-axle assembly, brackets or other components such as flexible or curved securing bars 24A can be added to the wheel-axle assembly frame to accommodate such objects and permit the installation of the assembly on the towed object.

The towing rigs disclosed herein have numerous advantages. The towing fixture, for example, is a simple and lightweight unit which can be attached to a large, bulky object at at least a single point and attached to a tow tractor by a simple trailer hitch or the like, yet provides a stable and reliable connection with the towed object. In combination with the buoyant wheel-axle assembly, such towing fixtures provide towing rigs which can be conveniently used for launching floating objects into the water, subsequent recovery, and transport between the sites of use and storage sites ashore. In operation, the towing rig is simply affixed to the object to be towed at the storage site, including hookup of any required braking or lighting connections, and the wheel-axle assembly is placed under the object and the supporting bars tightened around the object by tensioning means to firmly fix the wheel-axle assembly to the object to be towed. To place the wheels on such an object in storage, it may be necessary to use jacks, hoists or cranes to lift the end upon which the wheel-axle assembly is to be installed. Alternatively, if the object is stored upon blocks of an appropriate height, the wheel-axle assembly can be installed and the unit can be subsequently pulled off the storage blocks and wheeled on its way. Similarly, it may be necessary to raise the towed end of the object slightly to install the towing fixture. If the towing rig in which the towing fixture and wheel-axle assembly are connected by a rigid connector bar is used, it may be necessary to hoist the object onto the unit initially.

The object is then towed from the storage site to the launching site and the unit is backed down a launching ramp or other suitable smooth, graded surface to enter the water. When the unit is backed far enough into the water, the towed object will float free of the bottom, with the wheel-axle assembly still attached. If the towed object is very large or heavy and/or the ramp gradient is low, the towed object and wheel assembly may have to be rolled and/or floated some distance from the tow tractor at the shore after disconnecting the towing fixture from the object so that the wheels can be removed. Taking care to affix at least one safety/recovery line to the wheel-axle assembly, the tensioning means 34 can then be released and removed from the supporting bars so that they can be moved aside and the wheel-axle assembly 28 will float free of the floating object. The wheel-axle assembly can then be maneuvered clear of the floating object and towed ashore by means of the recovery lines. Once the floating object is installed or restrained by other means, the towing fixture can be removed for possible use with other units, or alternatively the towing fixture can be left in place on the object to simplify its later recovery.

To recover the object from the water, the wheel-axle assembly 28 is placed in the water and maneuvered into position, then fixed firmly to the floating object by means of the securing bars and tension means, the towing fixture installed if necessary, and the unit towed to shore, connected to a suitable tractor and towed up the ramp, thence to the storage site or other location.

Although the operation of the system has been described with regard to dock sections for use with small craft, which can be of relatively modest size, clearly the principles and various embodiments of the invention can be applied to more massive floating objects such as caissons, bridge sections, pipes, tanks, tunnel sections, large dock sections and the like; multiple heavy duty wheel-axle assemblies can be used if necessary to bear the load. These towing rigs can be of particular value in towing large, bulky, recreational craft such as rafts, swimming floats, houseboats, pontoon boats and the like, which otherwise would require a heavy duty truck with a large bed for the overland transport. The towing rigs of the present invention are not limited to use with floating objects, but can be used to transport a variety of objects, including cargo containers, non-buoyant tanks, drums or the like, and flexible fuel bladders.

EXAMPLE

The invention will be further illustrated by the following example, in which a prototype towing rig was constructed employing a towing fixture as depicted in FIGS. 1, 2 and 3, with the dimensions of the upper bar assembly being about 2 feet long and four feet wide and the dimensions of the vertical bar being about 1 foot. A wheel-axle assembly utilizing conventional automotive tires was constructed and attached to a floating dock section measuring approximately 16 feet long by 6 feet wide by 2 feet deep, using a cable and turnbuckle tensioning system. The towing rig, as applied to such a dock section, produced a stable unit which could be easily towed on paved or unpaved surfaces and could be backed into the water for release of the dock section and subsequently towed out for recovery over a launching ramp of about 25 percent grade without any slippage or difficulty. Both a light pickup truck and a small farm tractor were used as the tow vehicle. By using a towing fixture configured to distribute the load on top of the towed dock sections, damage to the soft flotation material exposed on the bottom was avoided. The towing fixture employed hinge posts corresponding to those on commercially available dock sections, arranged so that the respective components of the fixture and dock section could be connected by pins when the fixture was mounted. Based on the experience with this prototype, it is expected that the towing fixture and axle-wheel combination could be scaled up substantially for transporting, launching and recovering larger and heavier units within the limits permitted by normal highway travel, or even larger units for off-the-road operations, provided sufficient wheels or rollers were provided to avoid penetration and sticking in soft ground or sand.

From the foregoing descriptions, taken in connection with the accompanying drawings, the advantages of the towing rigs of the present invention, including at least the towing fixtures and buoyant wheel-axle assemblies, will be readily apparent to those skilled in the art. It should be understood that the drawings are merely illustrative and do not provide exact proportions or limit the invention to the embodiments depicted. The drawings and the above description are illustrative only of certain preferred embodiments, and various changes and modifications may be made without departing from the spirit and the scope of the invention, which is limited only by the appended claims.

I claim:

1. A towing rig comprising a towing fixture comprising in rigid combination:
   (a) a tow bar assembly with a connection for a tow tractor,
   (b) vertically swivelable connecting means on a substantially vertical member of a vertical bar structure for connection of said tow bar assembly to a forward surface of an object to be towed, said object having a top surface on at least the forward portion thereof, and
   (c) a load-distributing bar assembly substantially perpendicular to said vertical member and having a substantially horizontal member, configured to bear upon at least the forward top surface of said object to be towed by pivoting of said towing fixture when pull is exerted upon the tow bar assembly of the towing fixture, thereby forming a stable unit for towing, further comprising at least one wheel-axle assembly having means for temporary attachment to said object to be towed, and further comprising rigid connector means vertically swivelably attached to a lower portion of said vertical bar structure of said towing fixture and rigidly attached to said wheel-axle assembly.

2. A towing rig in accordance with claim 1 wherein said swivelable connecting means comprise at least one hinge post on said towing fixture which can be connected to a corresponding hinge post on said object to be towed by a hinge pin.

3. A towing rig in accordance with claim 1 wherein said wheel-axle assembly is buoyant in water.

4. A towing rig in accordance with claim 3 wherein said wheel-axle assembly is variably buoyant.

5. A towing rig in accordance with claim 1 wherein said wheel-axle assembly includes frame and suspension means.

6. A towing rig in accordance with claim 5 wherein said suspension means include at least one means selected from the group consisting of coil springs, leaf springs and air suspension means.

7. A towing rig in accordance with claim 1 wherein attachment means comprising at least two securing bars are hingeably attached to a frame of said wheel-axle assembly, and include tension means to exert pressure on the towed object when said securing bars are placed on each side thereof.

8. A towing rig in accordance with claim 7 wherein said securing bars are curved to conform to the shape of the object to be towed.

9. A towing rig in accordance with claim 7 wherein said securing bars are deformable to conform to the shape of the object to be towed.

10. A towing rig in accordance with claim 1 wherein said rigid connector means is adjustable in length.

11. A towing rig in accordance with claim 1 wherein said load-distributing bar assembly is configured to fit and bear upon a convex, rounded top surface of the object to be towed.

12. A towing rig in accordance with claim 11 adapted for towing cylindrical objects.

13. A towing rig for towing, launching and recovering floating dock units having a substantially complete top surface, comprising a towing fixture having in rigid combination:
   (a) a tow bar assembly with a connector for a tow tractor,
   (b) a vertical bar assembly having a vertical member with means for vertically swivelable connection to a leading vertical surface of said dock unit, and
   (c) an upper load-distributing bar assembly substantially perpendicular to said vertical member and having a substantially horizontal member configured to bear upon at least the forward top surface of said dock unit when towed by pivoting of said towing fixture so as to form a stable unit for towing, and
   a buoyant wheel-axle assembly comprising axle means and at least two wheels fitted thereon which further comprises means for temporary attachment to the after end of said dock unit, wherein said towing fixture is attached by vertical swivel means to rigid connector bar means which is rigidly connected to said wheel-axle assembly.

14. A towing rig in accordance with claim 13 wherein said wheel-axle assembly comprises a frame, suspension means connecting said axle means and said frame, and at least two vertical securing bars hingeably attached to said frame and adapted for vertical placement on either side of said dock unit, with tensioning means to fix said securing bars and said wheel-axle assembly firmly to said dock unit.

15. A towing rig in accordance with claim 13 wherein said connector bar means is detachable from said wheel-axle assembly.

16. A towing rig in accordance with claim 13 wherein said rigid connector bar means is adjustable in length.

17. A towing rig in accordance with claim 16 wherein said rigid connector bar means is telescopically adjustable in length.

18. A towing rig in accordance with claim 13 wherein said upper load-bearing assembly includes a plurality of adjustable load-bearing fixtures.

19. A towing rig for towing, launching and recovering floating dock units having a substantially complete top surface, comprising a towing fixture having in rigid combination:
   (a) a tow bar assembly with a connector for a tow tractor,
   (b) a vertical bar assembly with means for vertically swivelable connection to a leading vertical surface of said dock unit, and
   (c) an upper load-distributing bar assembly substantially perpendicular to said vertical member and having a substantially horizontal member configured to bear upon at least the top forward surface of said dock unit by pivoting of said towing fixture when towed so as to form a stable unit for towing.
   a buoyant wheel-axle assembly having means for temporary attachment to the after end of said dock unit; and
   rigid connector bar means attached to said towing fixture by vertically swivelable means and rigidly connected to said wheel-axle assembly.

* * * * *